United States Patent
Khan et al.

(10) Patent No.: US 8,630,303 B2
(45) Date of Patent: Jan. 14, 2014

(54) PREVENTING LOOPS IN NETWORKS OPERATING DIFFERENT PROTOCOLS TO PROVIDE LOOP-FREE TOPOLOGY

(75) Inventors: Tameen Khan, Santa Clara, CA (US); Ronak Desai, Fremont, CA (US); Dino Farinacci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 257 days.

(21) Appl. No.: 12/927,475

(22) Filed: Nov. 15, 2010

(65) Prior Publication Data

US 2011/0064002 A1 Mar. 17, 2011

Related U.S. Application Data

(62) Division of application No. 11/880,322, filed on Jul. 20, 2007, now Pat. No. 7,864,712.

(51) Int. Cl.
*H04L 12/28* (2006.01)

(52) U.S. Cl.
USPC ........... 370/406; 370/255; 370/256; 370/401; 370/466

(58) Field of Classification Search
None
See application file for complete search history.

(56) References Cited

U.S. PATENT DOCUMENTS

| | | | |
|---|---|---|---|
| 6,278,687 B1 | 8/2001 | Hunneyball | |
| 7,564,858 B1 | 7/2009 | Moncada-Elias et al. | |
| 7,688,756 B2 * | 3/2010 | Allan et al. | 370/254 |
| 7,693,164 B1 * | 4/2010 | Busch et al. | 370/401 |
| 8,248,920 B2 * | 8/2012 | Tallet | 370/222 |
| 8,270,319 B2 * | 9/2012 | Casey et al. | 370/256 |
| 2004/0081171 A1 * | 4/2004 | Finn | 370/395.53 |
| 2005/0259597 A1 | 11/2005 | Benedetto et al. | |
| 2006/0140136 A1 | 6/2006 | Filsfils et al. | |
| 2006/0159029 A1 | 7/2006 | Samuels et al. | |
| 2007/0058571 A1 | 3/2007 | Rose | |
| 2007/0159983 A1 * | 7/2007 | Eglin et al. | 370/254 |
| 2008/0107027 A1 * | 5/2008 | Allan et al. | 370/235 |
| 2008/0107043 A1 * | 5/2008 | Smith et al. | 370/255 |
| 2008/0239943 A1 * | 10/2008 | Hauenstein et al. | 370/216 |
| 2009/0274153 A1 | 11/2009 | Kuo et al. | |
| 2010/0054157 A1 * | 3/2010 | Farkas et al. | 370/256 |

OTHER PUBLICATIONS

"Virtual Bridge Local Area Network", IEEE std 802.1Q, pp. 131-189, May 19, 2006.
"Media Access Control (MAC) Bridges", IEEE std 802.1D, pp. 137-179, Jun. 9, 2004.

* cited by examiner

*Primary Examiner* — Donald Mills
(74) *Attorney, Agent, or Firm* — Cindy Kaplan (57) ABSTRACT

A method and apparatus for preventing loops in a network with network devices operating a spanning tree protocol and network devices operating a link state routing protocol to prevent loops are disclosed. In one embodiment, a method includes receiving from one of the network devices operating a link state protocol, a link state routing synchronization packet at a first network device in communication with one of the network devices operating the spanning tree protocol, blocking at the first network device, boundary ports in communication with the network devices operating the spanning tree protocol, transmitting a link state routing synchronization acknowledgement packet at the first network device after the boundary ports are blocked, and performing a loop-free topology convergence process at the first network device.

20 Claims, 13 Drawing Sheets

PREVENTING LOOPS IN NETWORKS OPERATING DIFFERENT PROTOCOLS TO PROVIDE LOOP-FREE TOPOLOGY

STATEMENT OF RELATED APPLICATION

The present application is a divisional of U.S. patent application Ser. No. 11/880,322, filed Jul. 20, 2007, the contents of which are incorporated by reference herein for all purposes.

BACKGROUND

The present disclosure relates generally to preventing loops in a computer network, and more particularly, mechanisms for preventing loops in networks operating different protocol to provide a loop-free topology.

Link state routing is a protocol that allows a node in a network to determine network topology by sharing information about transmission cost to each of its neighboring nodes. Link state routing packets are transmitted to neighbors and received from neighbors. The least expensive path to various destinations is determined using the link state information. Transient loops can sometimes arise when network topology changes because neighboring nodes may not be forwarding transmissions using the same generated network topology. One mechanism for preventing loops is Spanning Tree Protocol (STP).

The Spanning Tree Protocol executes on a switch and operates to maintain a loop-free topology in a Layer 2 (L2) switched network. Devices such as a Classical Ethernet (CE) switches may use STP to prevent loops. Other devices such as Data Center Ethernet (DCE) switches may be configured to use protocols other than STP to provide loop-free operation.

While STP and other protocols work well for a stand-alone network comprising switches that utilize only one protocol for preventing loops, the different protocols may not interoperate and therefore cannot be used in a combined network operating with different protocols.

In addition to preventing loops in a combined network, it is also desired to provide rapid convergence in accordance with Rapid Spanning Tree Protocol (RSTP) (IEEE 802.1w) regardless of the protocols used in the networks for preventing loops.

BRIEF DESCRIPTION OF THE DRAWINGS

Corresponding reference characters indicate corresponding parts throughout the several views of the drawings.

DESCRIPTION OF EXAMPLE EMBODIMENTS

Overview

A method and system for preventing loops in a network comprising network devices operating different protocols for providing loop-free topology are disclosed. In one embodiment, a method generally comprises receiving link state information at a network device operating a first protocol and in communication with a network device operating a second protocol, creating at least one tunnel to one or more other network devices operating the first protocol and in communication with a network device operating the second protocol, receiving a proposal, blocking designated boundary ports in communication with network devices operating the second protocol, and transmitting an agreement.

In another embodiment, a method generally comprises receiving from a network device operating a link state protocol, a link state routing synchronization packet at a first network device in communication with a network device operating a spanning tree protocol, blocking at the first network device boundary ports in communication with the network devices operating the spanning tree protocol, transmitting a link state routing synchronization acknowledgement packet at the first network device after the boundary ports are blocked, and performing a loop-free topology convergence process at the first network device.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Link state information is used to generate network topology information at various network nodes to create forwarding tables. The forwarding tables allow network nodes such as switches and bridges to forward received traffic on an appropriate output interface. In order to generate a network topology map and a forwarding table at a specific node, link state information is distributed from various network nodes. Each network node is configured to create a link state packet having information about the distance, delay, or cost to each of its neighbors. A link state record (LSR) is then transmitted to neighboring nodes. A network node receiving link state packets from the other nodes in a network can apply Dijkstra's algorithm to generate a network topology map for building a forwarding table.

Transient loops may arise when network topology changes because neighboring nodes may not be forwarding transmissions using the same generated network topology. Transient and permanent loops waste network bandwidth and may burden end nodes with duplicate copies.

A method and system described herein operate to prevent transient and permanent loops in a network comprising nodes operating different protocols for providing a loop-free topology. In one embodiment, a first protocol is IS-IS (Intermediate System to Intermediate System) or another transient loop free link state routing protocol running on Data Center Ethernet (DCE) devices, and a second protocol is a Spanning Tree Protocol running on Classical Ethernet (CE) devices. The term Spanning Tree Protocol (STP) as used herein includes any version of STP, including for example, traditional STP (IEEE 802.1d), Rapid Spanning Tree Protocol (RSTP) (IEEE 802.1w), Multiple Spanning Tree Protocol (MSTP) (IEEE 802.1s), or any other Spanning Tree Protocol. In this embodiment, the system interoperates with STP at the CE network and interacts with IS-IS in an interlock manner at the DCE network to prevent transient loops.

The method and system are referred to herein as Ethernet Gateway Interlock Protocol (EGIP). EGIP prevents loops in combined networks (e.g., DCE and CE networks), and provides rapid convergence in accordance with Rapid Spanning Tree (IEEE 802.1w). EGIP operates as a gateway for STP BPDUs (Bridge Protocol Data Units) from the CE network to go across the DCE network. As described below, EGIP tunnels the STP BPDUs across the DCE network. EGIP operates so that STP running on CE networks can achieve rapid convergence when going across the DCE network.

The examples described herein are in the context of link state routing for DCE networks in communication CE networks running STP. However, it is to be understood that the system and method can be applied to different variations of DCE, CE, and fibre channel, as well as to other networks and devices. EGIP may be used to prevent loops in any networks in which at least two of the networks include devices utilizing different protocols for providing a loop-free topology. For example, the system and method may be used with any combination of STP/RSTP/MSTP and non-STP networks.

Figure 1:
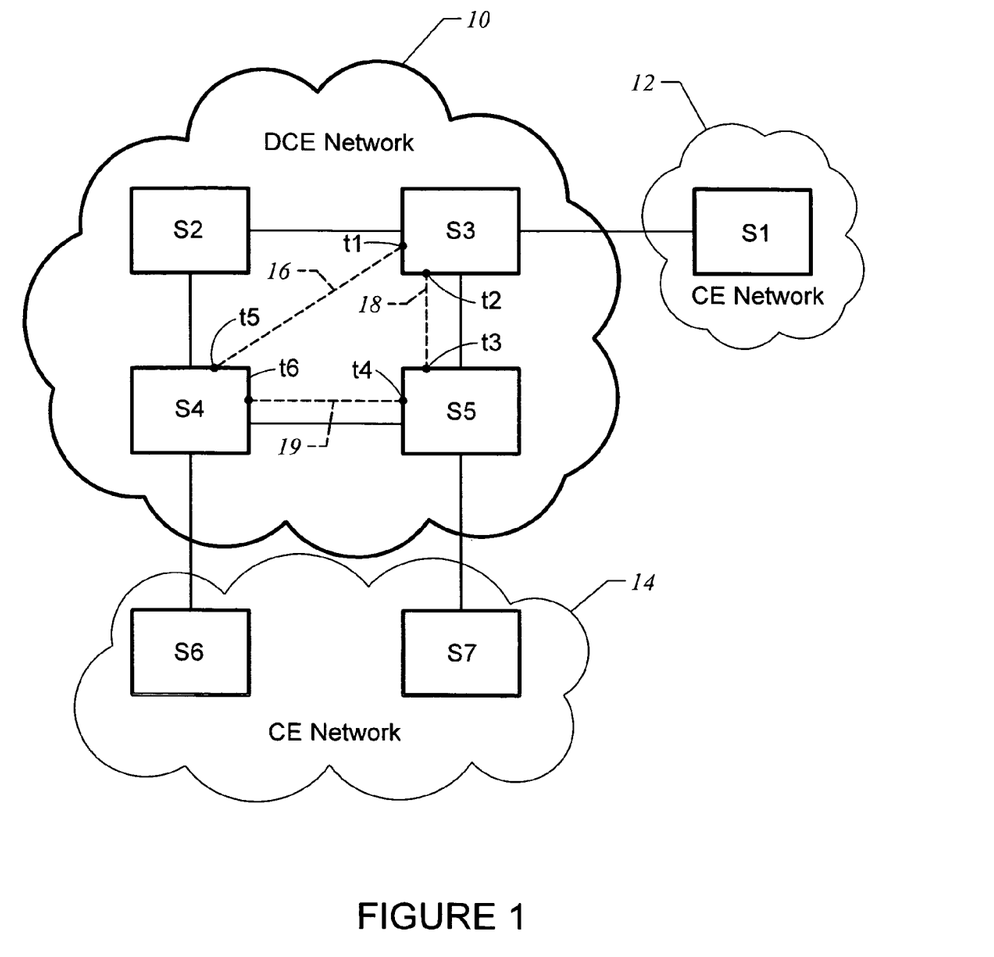
FIG. 1 illustrates an example of a network in which embodiments described herein may be implemented.

Referring now to the drawings, and first to FIG. 1, an example of a network in which EGIP may be implemented is shown. The embodiments described herein operate in the context of a data communication network including multiple network devices. Some of the devices in a network that employs EGIP may be switches, bridges, gateways, or other network devices. The network nodes S1, S2, S3, S4, S5, S6, S7 shown in FIG. 1 represent a network device such as a bridge or switch used for layer 2 forwarding. The network device may include, for example, a master central processing unit (CPU), memory, interfaces, and a bus. In one embodiment, the network device is implemented on a general purpose network host machine as described below with respect to FIG. 7.

The example shown in FIG. 1 includes a DCE network 10 in communication with two CE networks 12, 14. The network devices (e.g., switches) S2, S3, S4, S5 operating within the DCE network 10 may use, for example, IS-IS for unicast and multicast packet forwarding. It is to be understood that IS-IS is only one example and that other suitable link state routing protocols (e.g., Fabric Shortest Path First (FSPF), Open Shortest Path First (OSPF)) may also be used. A mechanism such as described in U.S. patent application Ser. No. 11/378,990, filed Mar. 17, 2006, (U.S. Patent Application Publication No. 2007/0127396, published Jun. 7, 2007), which is incorporated herein by reference in its entirety, may be used to prevent broadcast loops within the DCE network. In one embodiment, switches S1 in CE network 12 and switches S6, S7 in CE network 14 are configured to utilize a spanning tree protocol (e.g., STP, RSTP, MSTP) to prevent loops within their network. EGIP runs on DCE boundary switches (S3, S4, S5) which connect to the CE networks 12, 14 to prevent loops in the combined DCE-CE network.

When IS-IS is utilized as the link state routing protocol in the DCE network, IS-IS link state packets (LSPs) are preferably configured to include an additional TLV (type length value) indicating if a switch is a DCE-CE boundary switch (e.g., switch located at a boundary of the DCE network and in communication with the CE network). As described below, when a DCE switch becomes a DCE-CE boundary switch, updated IS-IS information is synced to all switches before the new DCE-CE boundary switch can change state at the boundary ports to forwarding.

In one embodiment, the boundary switches S3, S4, S5 use IS-IS adjacency information to build an overlay network of tunnels to operate over the DCE network 10. EGIP on the boundary switches interacts with a local IS-IS process to inform IS-IS that the switch is a DCE-CE boundary switch and, create or delete tunnel ports based on the IS-IS database.

FIG. 1 illustrates an EGIP point-to-point tunnel model. Tunnels 16, 18, 19 are created between the DCE-CE boundary switches S3, S4, S5 in the DCE network 10. Tunnel 16 is connected to tunnel port t1 (at S3) and t5 (at S4), tunnel 18 is connected to tunnel ports t2 (at S3) and t3 (at S5), and tunnel 19 is connected to tunnel ports t4 (at S5) and t6 (at S4). The ports t1, t2, t3, t4, t5, and t6 are logical ports used for EGIP control plane communication. The tunnel ports are configured such that they cannot be blocked for data traffic. Unicast and broadcast data traffic follows the path of the broadcast tree computed by IS-IS inside the DCE network.

The point-to-point tunnel model shown in FIG. 1 is only one example. EGIP may also be configured with a point-to-multipoint tunnel. For example, a tunnel port at S3 may connect to a tunnel (not shown) that branches off and connects to ports at S4 and S5.

In one embodiment, EGIP runs MSTP (Multiple STP) Common Spanning Tree (CST) computations on boundary and tunnel ports. The boundary ports are treated as MSTP boundaries. MSTP computations are used to ensure that a loop is broken at a boundary port and not at a tunnel port. MSTP BPDUs are transmitted on boundary ports and tunneled to all boundary switches on tunnel ports.

Since tunnel ports are logical ports and cannot be blocked, a proposal (e.g., RSTP proposal) or re-root on a boundary or tunnel port involve special handling as described in the following examples.

Figure 2A:
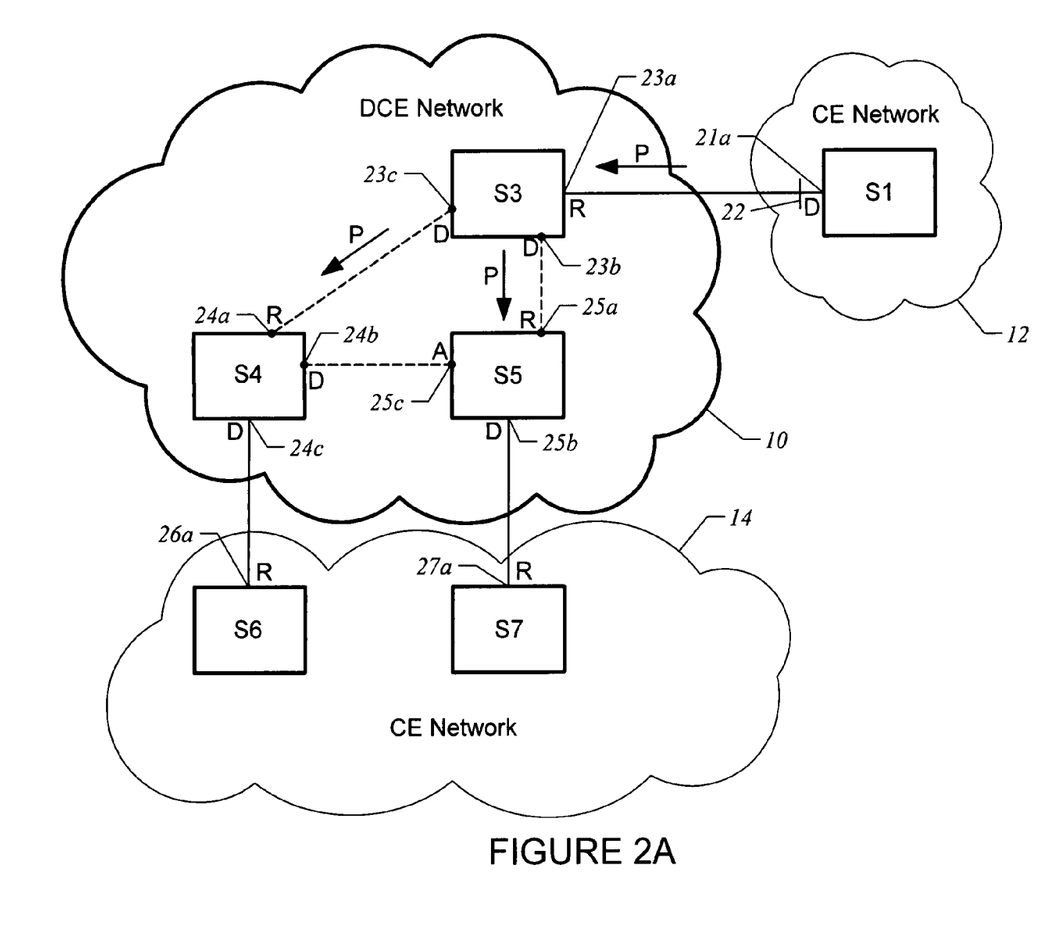
FIGS. 2A-2B illustrate operation at boundary devices upon receiving an RSTP proposal.
Figure 2B:
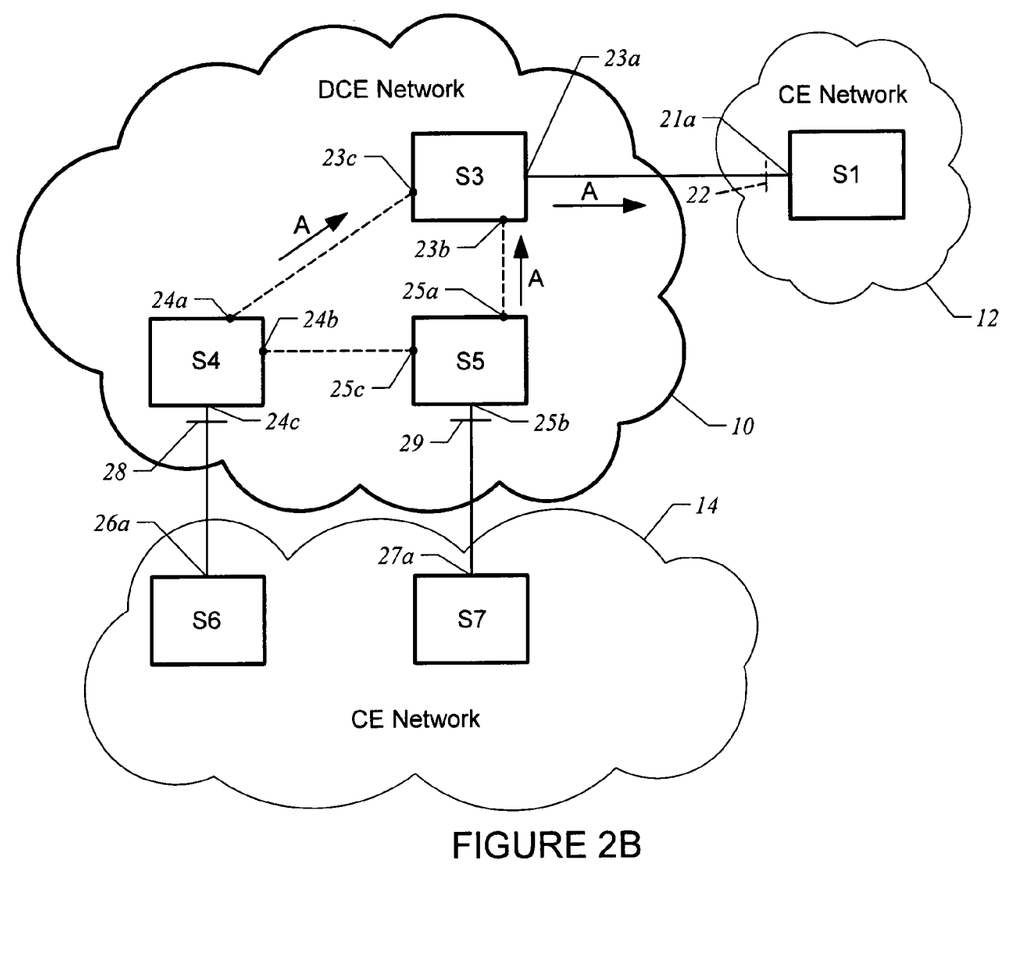

The diagrams of FIGS. 2A and 2B illustrate how EGIP handles a proposal from a CE switch at DCE-CE boundary device. For simplification, only DCE boundary switches S3, S4, S5 and tunnels 16, 18, 19 of FIG. 1 are shown in DCE network 10 in FIG. 2A. In one embodiment, EGIP sets each port at the boundary device in a discarding state, learning state, or forwarding state (as set forth in RSTP standard IEEE 802.1w). A port in the discarding state is blocked and does not participate in forwarding. Each port is also assigned a role. A Spanning Tree Algorithm (STA) may be used to determine the role of a port based on BPDUs (Bridge Protocol Data Units). The port that receives the best BPDU on a switch is the root port. This is the port that is closest to the root switch in terms of path cost. A port is designated if it can send the best BPDU on the segment to which it is connected. A blocked port is either an alternate port or a backup port. The alternate port serves as an alternate port for the root port and provides a redundant path towards the root switch. The backup port provides a backup for the designated port and receives more useful BPDUs from the same switch it is on. As described below, the network uses an agreement/proposal handshake mechanism to rapidly converge after a topology change. A designated port can be transitioned to the forwarding state after it receives an agreement from another switch attached to the link.

In one embodiment, a boundary root port performs the following actions upon receiving a proposal:
All designated boundary ports are blocked;
A proposal is sent on all designated tunnel ports;

When an agreement has been received from all designated tunnel ports, an agreement is sent back on the boundary root port.

When a proposal is received on a tunnel root port, the following actions are performed:

All designated boundary ports are blocked;
An agreement is sent back on the tunnel root port.

In the example shown in FIG. 2A, ports 23a, 24a, 25a, 26a, and 27a are root (R) ports; ports 21a, 23b, 23c, 24b, 24c, and 25b are designated (D) ports; and port 25c is an alternate (A) port. Ports 23b, 23c, 24a, 24b, 25a, and 25c are tunnel ports and cannot be blocked, as previously discussed. The following describes a proposal/agreement sequence following a topology change. Port 21a at S1 is blocked at cut 22 and S1 sets the proposal bit on the BPDUs it sends out. The proposal (P) is received at S3 on port 23a, which is a boundary root port. Upon receiving the proposal, S3 sends a proposal (P) on designated tunnel ports 23b, 23c. S4 and S5 receive the proposal on tunnel root ports 24a, 25a. Upon receiving the proposals, S4 and S5 block their designated boundary ports 24c, 25b to form cuts 28, 29 as shown in FIG. 2B. S4 and S5 send agreements (A) back on the tunnel root ports 24a, 25a. The agreement (A) message is a copy of the original proposal configuration message, except that the proposal bit is now off and the agreement bit is on. After S3 receives an agreement from designated tunnel ports 23b, 23c, an agreement (A) is sent back on the boundary root port 23a. Once S1 receives the agreement, it can immediately transition to the forwarding state and port 21a is no longer blocked (cut 22 removed).

The proposal/agreement mechanism is very fast, since it does not rely on any timers. The wave of handshakes propagates quickly towards the edge of the DCE network, and quickly restores connectivity after a change in topology.

Figure 3A:
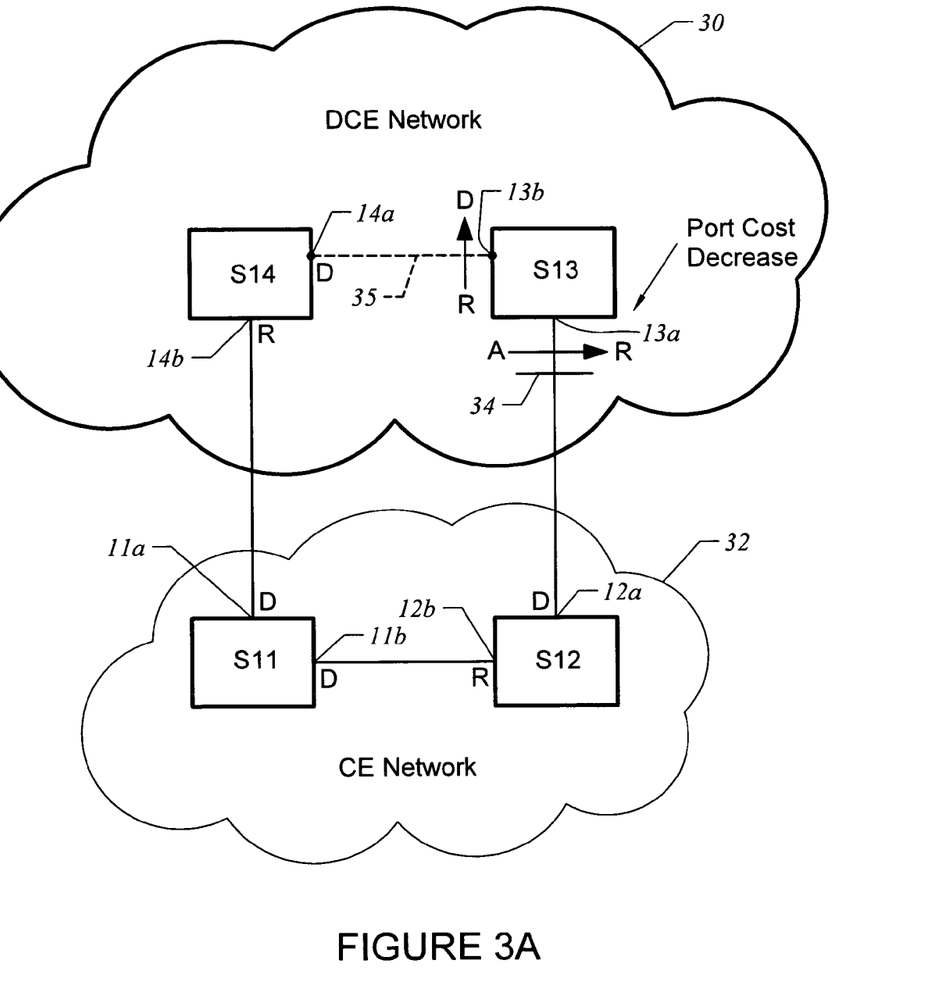
FIGS. 3A-3C illustrate operation at boundary devices during a re-root process.
Figure 3B:
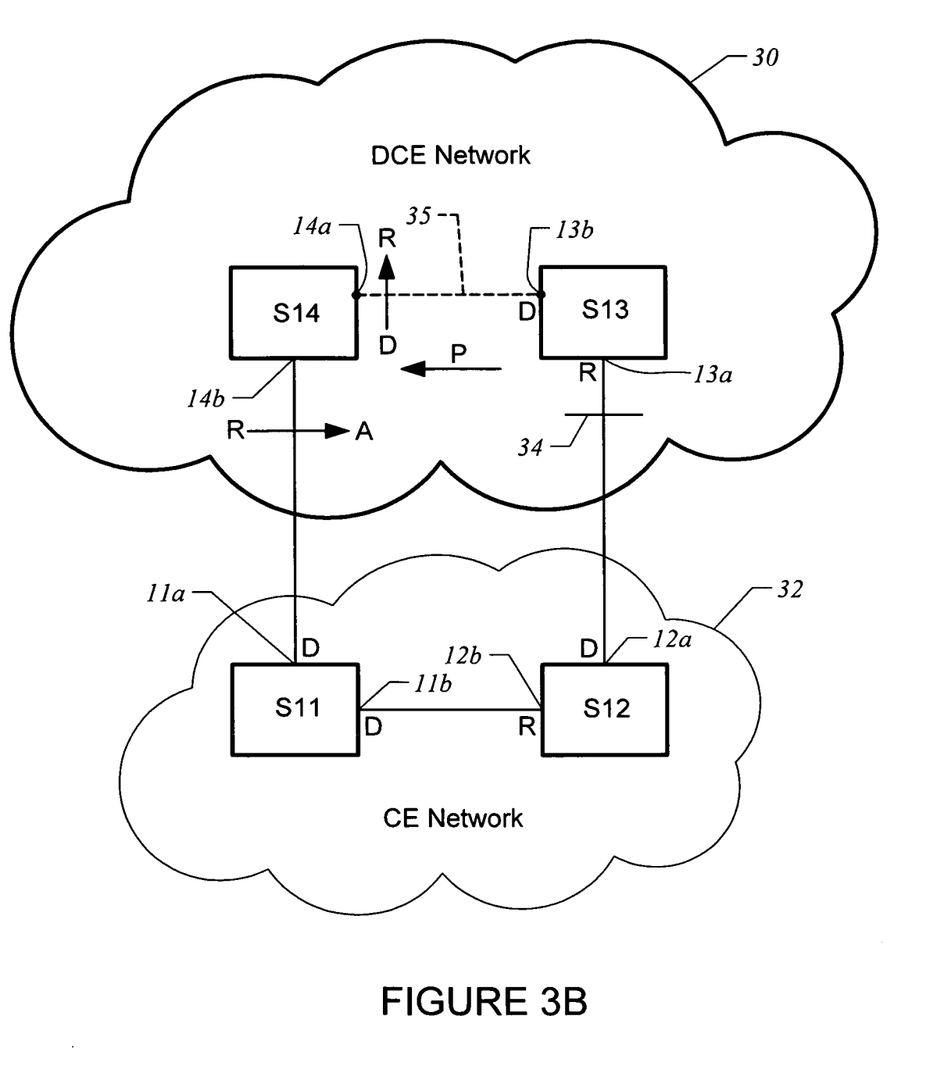
Figure 3C:
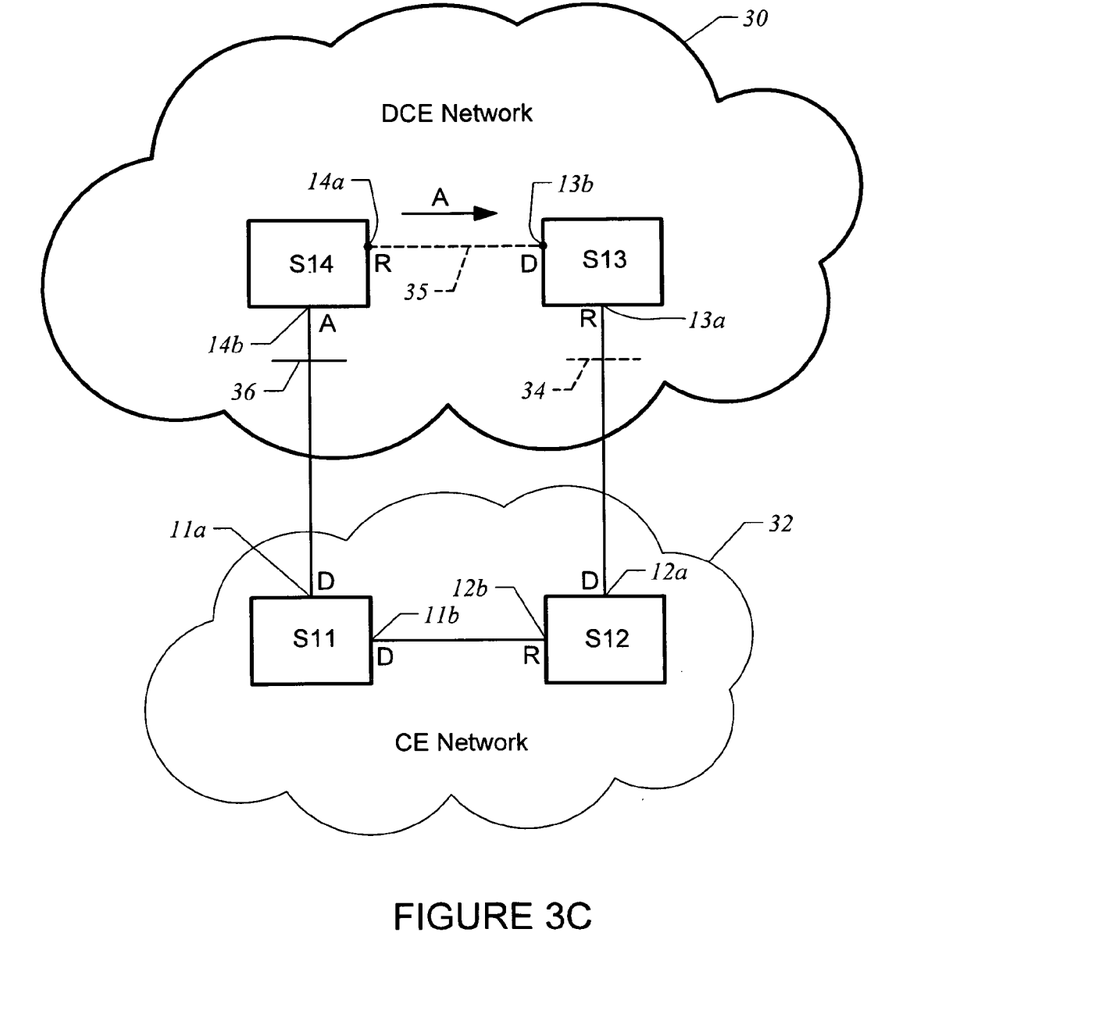

FIGS. 3A-3C illustrate EGIP operation during a re-root operation in accordance with one embodiment. During re-root, the old root port is blocked before the new root port is changed to forwarding in order to avoid transient loops. If the old root port is a tunnel port, which cannot be blocked, a proposal is sent on the tunnel port, and the new root is made forwarding after an agreement is received.

Referring now to FIG. 3A, a DCE network 30 is shown in communication with a CE network 32. The DCE network 30 includes two switches S13 and S14. The CE network 32 includes two switches S11 and S12. It is to be understood that a small number of network nodes is shown for simplification and that the network may include any number or configuration of network devices. Adjacency information is used to create a tunnel 35 between boundary devices S13, S14 (ports 13b, 14a). Port 13a of S13 is initially an alternate (A) port and port 13b is a root (R) port. Port 14a of S14 is a designated (D) port and port 14b is a root (R) port. Ports 11a and 11b of S11 are designated (D) ports. Port 12a of S12 is a designated (D) port and port 12b is a root (R) port. Port 13a is initially the only blocked port (cut 34), with all other ports in forwarding state. The re-root process begins following a reduction in port cost at port 13a of S13. This results in a role change to ports 13a and 13b. Port 13a undergoes a role change from alternate (A) to root (R). Port 13b undergoes a role change from root (R) to designated (D).

Referring now to FIG. 3B, S13 transmits a proposal (P) at tunnel port 13b to S14. Upon receiving the proposal, port roles are recomputed. Root port 14b at S14 becomes an alternate (A) port and designated (D) port 14a becomes the root (R) port. As shown in FIG. 3C, the alternate port 14b is blocked (cut 36) along with any designated boundary ports (none in this example). S14 sends an agreement (A) from root port 14a to designated port 13b at S13. Once S13 receives the agreement, it can immediately transition to the forwarding state and port 13a is no longer blocked (cut 34 removed)

FIGS. 4A-4D illustrate how transient loops are prevented during a change in DCE fabric. EGIP interacts with the link state routing protocol to prevent any transient loops when two networks merge or split. For example, in one embodiment, IS-IS synchronizes with EGIP on boundary switches before making a merged DCE data-path forwarding. As described below, EGIP blocks boundary ports on the boundary device upon receiving a sync message from IS-IS and uses the proposal/agreement mechanism to interoperate with STP at the CE network to provide rapid convergence across the network and prevent any transient loops.

Figure 4A:
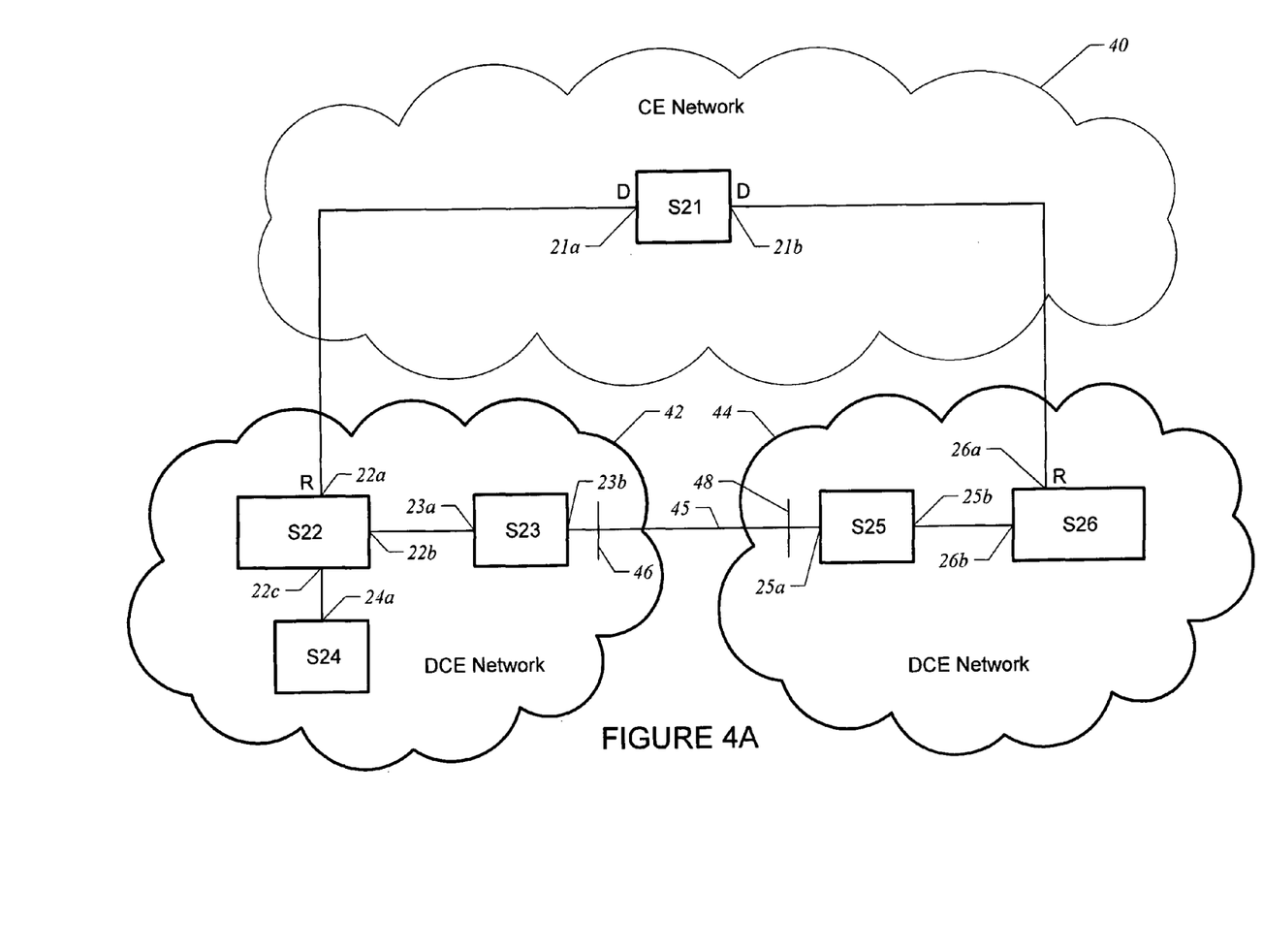
FIGS. 4A-4D illustrate a convergence process during a network merge.

FIG. 4A illustrates a CE network 40 in communication with two DCE networks 42, 44. In this example, switches S22, S23, S24 S25, and S26 are configured to run a link state routing protocol (e.g., IS-IS) to prevent loops in the DCE networks. Switches S22 and S26 are also configured with EGIP. Switch S21 is configured to run a spanning tree protocol to prevent loops within the CE network (additional nodes in CE network not shown). A new DCE-DCE link 45 is created between S23 and S25 upon a merge of networks 42 and 44. There is no loop in the DCE network, but a loop is created in the CE-DCE network. As described below, EGIP responds to this new link 45 and breaks the loop before any data traffic passes through the merged DCE networks. As shown in FIG. 4A, ports 23b at S23 and 25a at S25 are initially blocked (cuts 46 and 48).

Figure 4B:
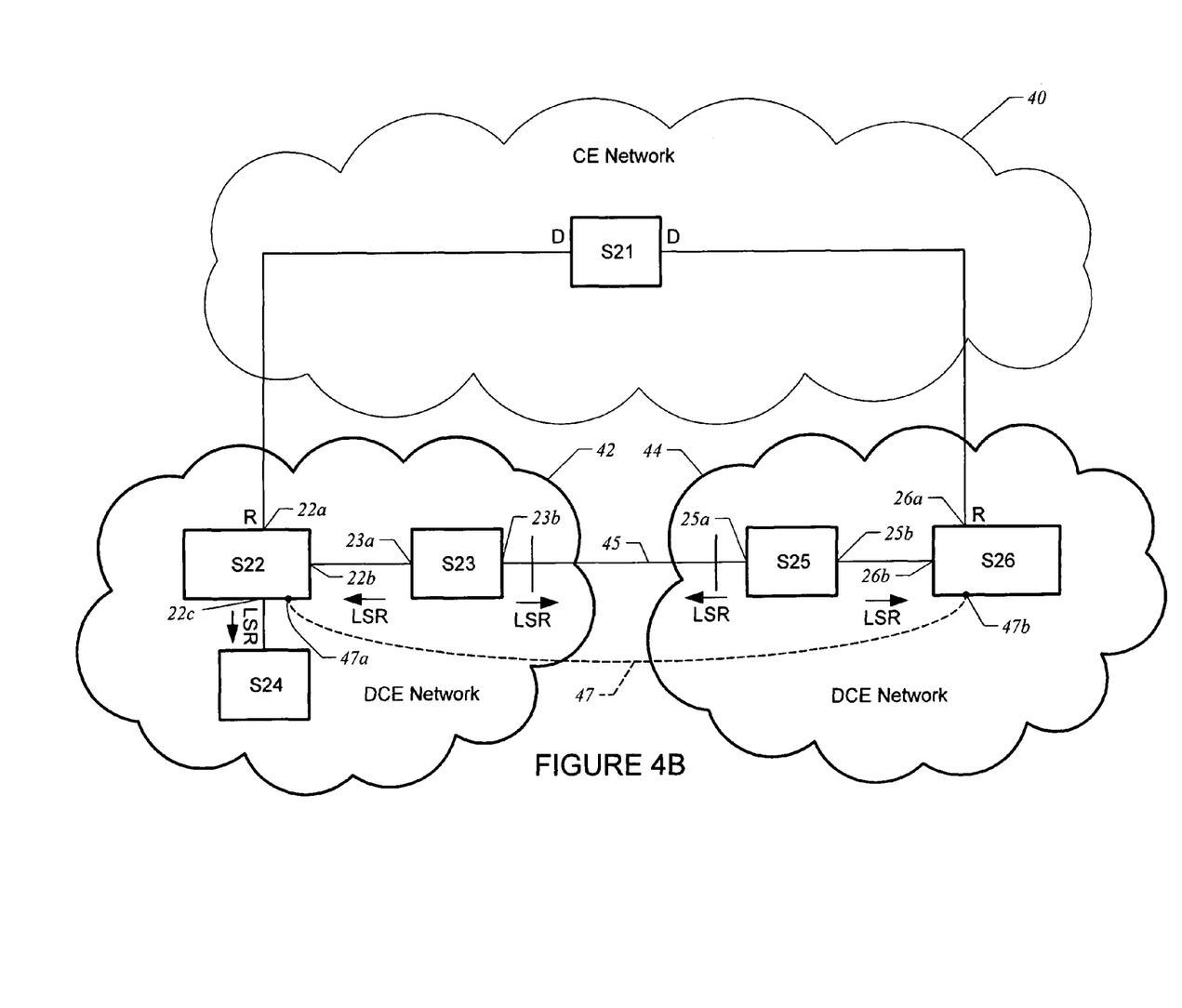

FIG. 4B illustrates flooding of LSRs (link state records) and tunnel port creation at EGIP boundary switches S22 and S26. LSRs are flooded throughout the DCE networks. Upon receiving an LSR, each switch transmits an LSR on all local links except the link on which the new LSR was received. Logical tunnel ports 47a, 47b of tunnel 47 are created at S22 and S26, respectively, after the nodes receive and process the LSRs.

Figure 4C:
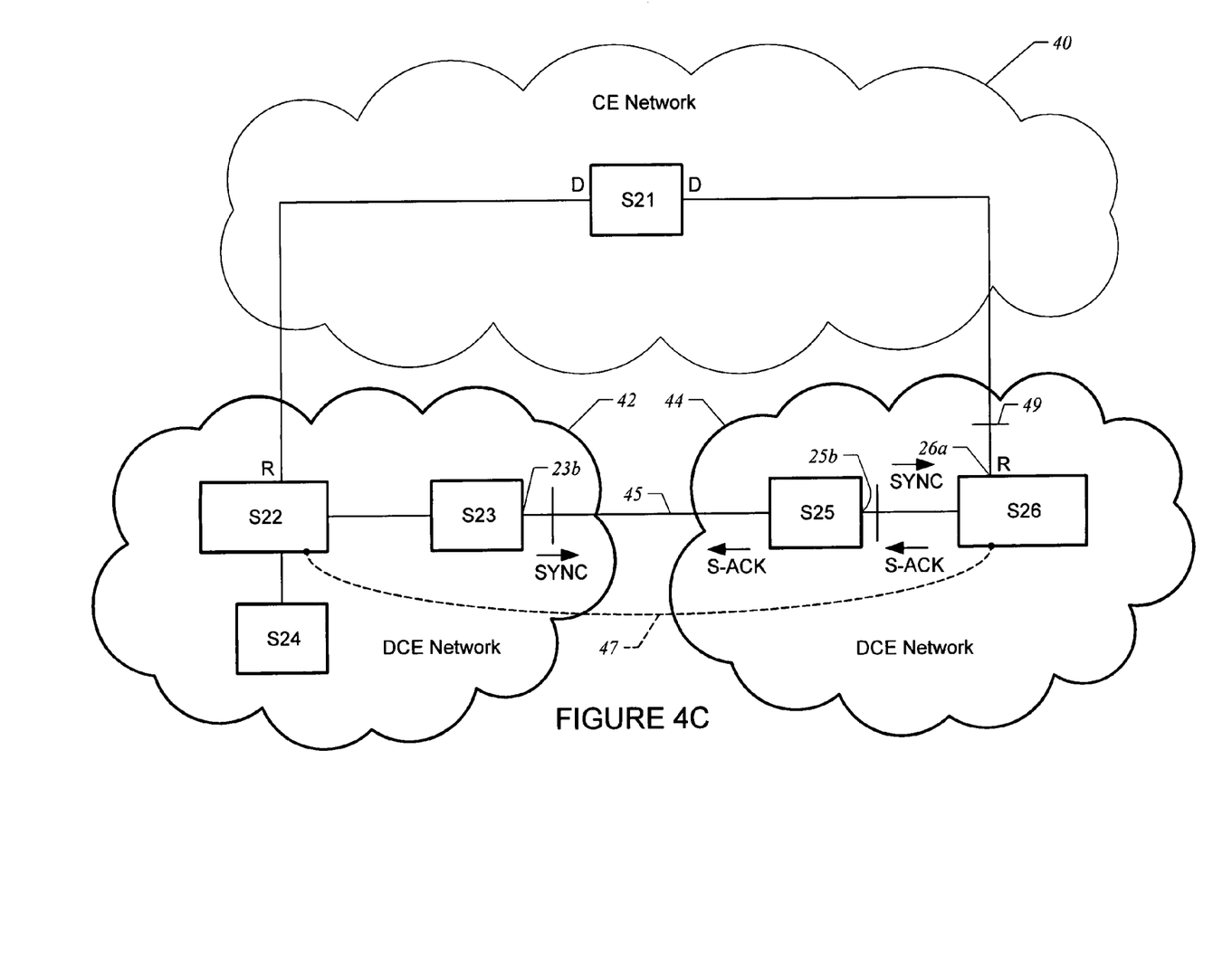

FIG. 4C illustrates synchronization propagation to EGIP running on the DCE-CE boundary switches S22, S26. For simplification, IS-IS and EGIP synchronization is only shown at S26, however, a similar process is performed at S22. A link state routing synchronization is performed between peer DCE nodes. In one embodiment, a synchronization process is performed as described in U.S. patent application Ser. No. 11/378,990 (U.S. Patent Application Publication No. 2007/0127396), referenced above. Sync and sync-ack packets (also referred to herein as link state routing synchronization and synchronization acknowledgement packets) are sent in order to verify consistent topology databases. The packets are transmitted using the link state routing protocol running on the network devices in the DCE network. The sync packet initiates a synchronization of the topology database with peer nodes and is sent on a port to request the peer to confirm when its database is in sync with the sender. The sync-ack packet is a response to the sync packet. In one embodiment, sync and sync-ack packets carry an incarnation number to identify the sync instance. A sync instance is complete when a sync-ack is received for the last incarnation number. It is to be understood that the link state routing synchronization process described herein is only one example, and that other processes may be used for link state routing topology convergence between the merged DCE networks.

Referring again to FIG. 4C, transmission of sync (SYNC) and sync-ack (S-ACK) packets between nodes S23, S25, and S26 is shown. Once the topology databases of S23 and S25 are synchronized, S25 sends a sync-ack packet to S23. S25 sends a sync packet to S26 and S26 begins a sync operation. After sync-ack packets are received, ports are changed to forwarding. For example, port 23*b* is changed to forwarding state upon receiving a sync-ack packet from S25 and port 25*b* is changed to forwarding state upon receiving sync-ack packet from S26. However, S26 does not respond to S25 with a sync-ack packet until a synchronization is performed between IS-IS and EGIP at S26, as described below.

Upon receiving the link state routing sync packet at boundary switch S26, IS-IS sends a sync message to EGIP. This is an internal message at network device S26, communicated between the link state routing protocol and EGIP. For example, this may be an internal IPC (inter process communication) message as both protocols are running on the same node (on different ports). When EGIP receives a sync message from IS-IS, it blocks the node's boundary ports before responding to the sync. The blocked boundary ports ensure that any potential loop caused by the merge is blocked before the DCE datapath is changed to forwarding. As shown in FIG. 4C, EGIP blocks boundary port S26*a* (cut 49). EGIP then sends a synchronization acknowledgement message to IS-IS. S26 can then send a link state routing sync-ack packet to S25, after IS-IS receives the acknowledgement from EGIP. When S25 receives the sync-ack packet, it unblocks port 25*b* and the IS-IS topology converges.

Figure 4D:
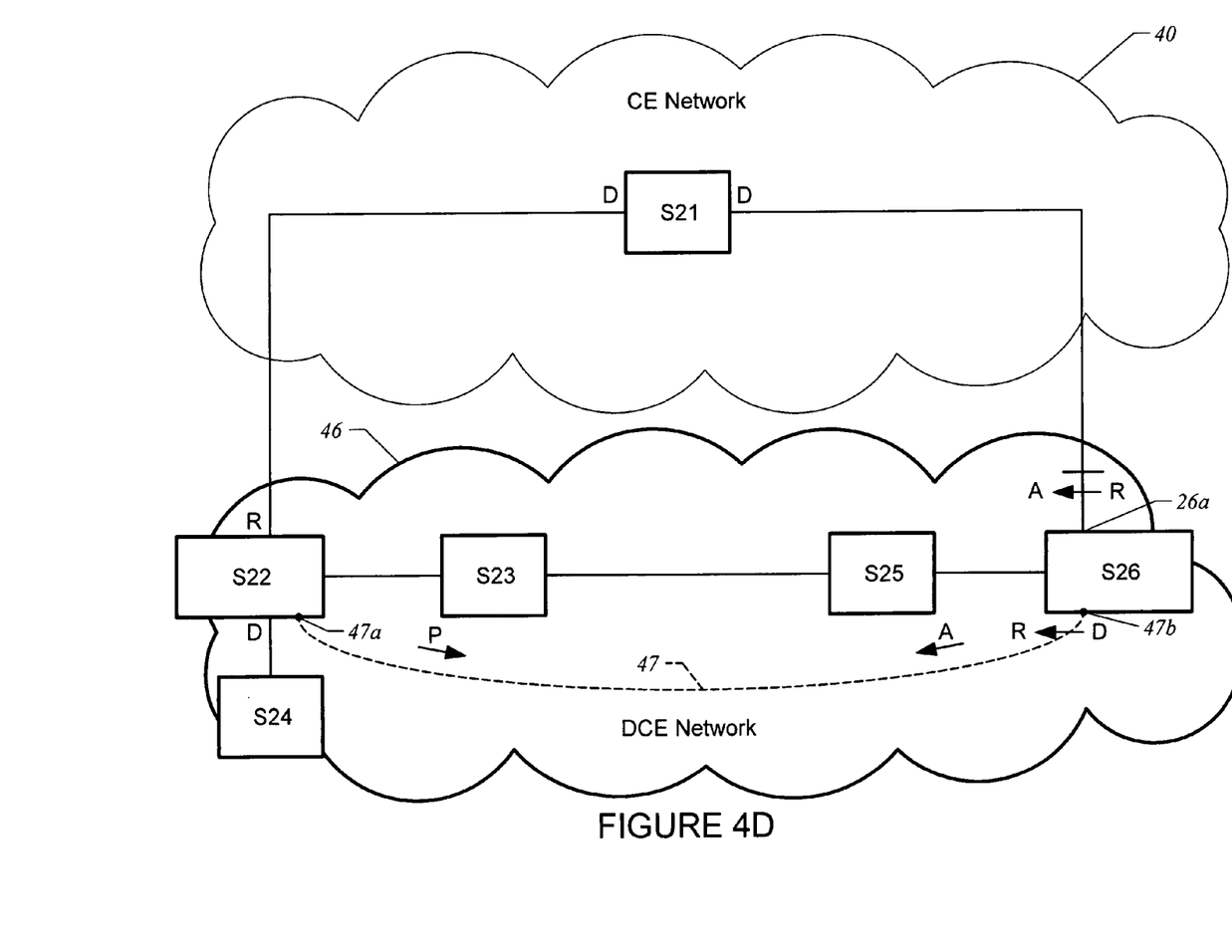

Following the link state routing topology convergence, an EGIP convergence process is performed. FIG. 4D illustrates one example of EGIP convergence using the RSTP proposal/agreement handshake mechanism previously described. For simplification, only the proposal from node S22 is shown, however, a proposal is also transmitted from node S26. The proposal (P) is sent over tunnel 47. Upon receiving the proposal, S26 recomputes its port roles. The root (R) port 26*a* changes to an alternate (A) port and designated (D) port 47*b* becomes the root (R) port. The alternate port 26*a* remains blocked. S26 sends an agreement over tunnel 47 to S22.

Figure 5:
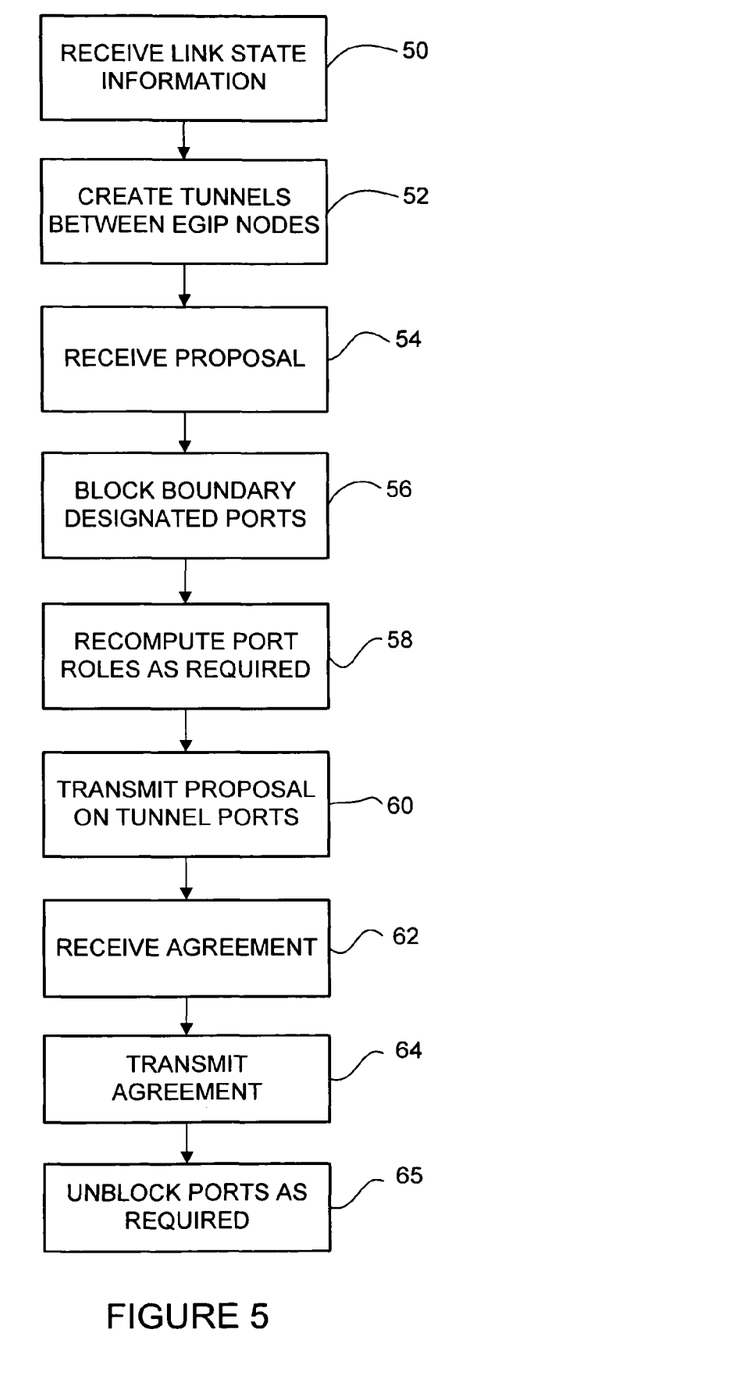
FIG. 5 is a flowchart illustrating a process for preventing loops in a network, in accordance with one embodiment.

FIG. 5 is a flowchart illustrating a process for handling a proposal at a boundary device, according to one embodiment. At step 50 a boundary device running EGIP receives a LSR. The boundary device creates a tunnel to other boundary devices running EGIP (e.g., FIG. 1) (step 52). Upon a topology change a proposal is received at the boundary device (step 54). After receiving a proposal at the boundary device, designated boundary ports are blocked (step 56) and port roles are recomputed, as required (step 58). A proposal is also sent out from the boundary device on any designated tunnel ports (step 60). The boundary device receives one or more agreements on its tunnel ports in response to the proposal previously sent (step 62). The boundary device then transmits an agreement (step 64) and ports are changed to forwarding as required (step 65). It is to be understood that one or more of the above steps may be deleted, depending on the location of the boundary device in the network. For example, referring to FIG. 2A, node S3 does not block any boundary designated ports (step 56) since it has no boundary designated ports to block. Node S5 does not transmit a proposal (step 60) or receive an agreement (step 62). Also, in the example of FIG. 2A, there is no recomputing of ports (step 58).

Figure 6:
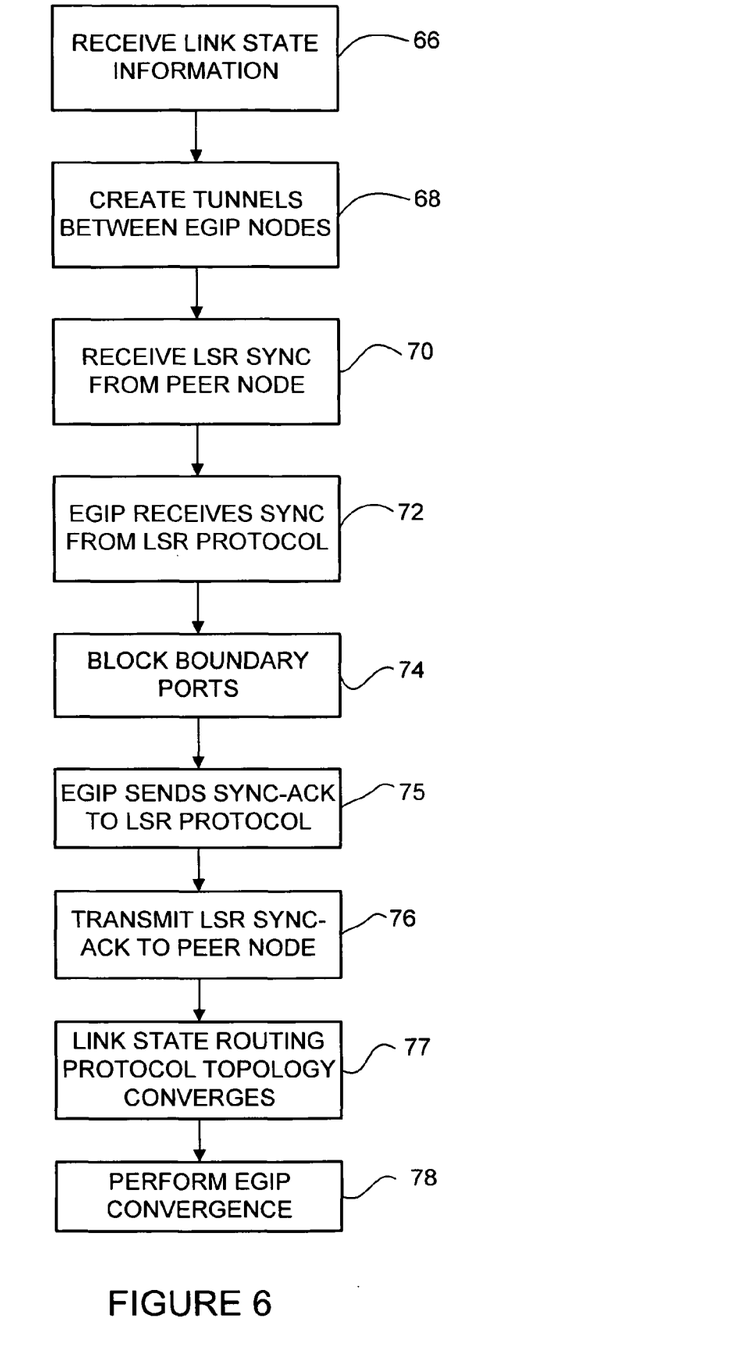
FIG. 6 is a flowchart illustrating a synchronization and convergence process during a network merge, in accordance with one embodiment.

FIG. 6 is a flowchart illustrating an interlock process with a link state routing protocol (e.g., IS-IS) following a change in network fabric, in accordance with one embodiment. At step 66, a boundary device running EGIP receives link state information. The boundary device creates one or more tunnels between other EGIP nodes (step 68) (e.g., FIG. 4B). The EGIP node receives a link state routing sync packet from its peer node at step 70 (e.g., FIG. 4C). EGIP receives a sync message from the link state routing protocol running on the boundary device (step 72) and blocks boundary ports (step 74). EGIP then sends a sync-ack message to the link state routing protocol (step 75). The boundary device can then transmit a link state routing sync-ack message to its peer node (step 76). The link state routing protocol topology converges at step 77. EGIP convergence is then performed as described above with respect to the flowchart of FIG. 5 to provide a loop-free topology within the new DCE/CE network (step 78).

Figure 7:
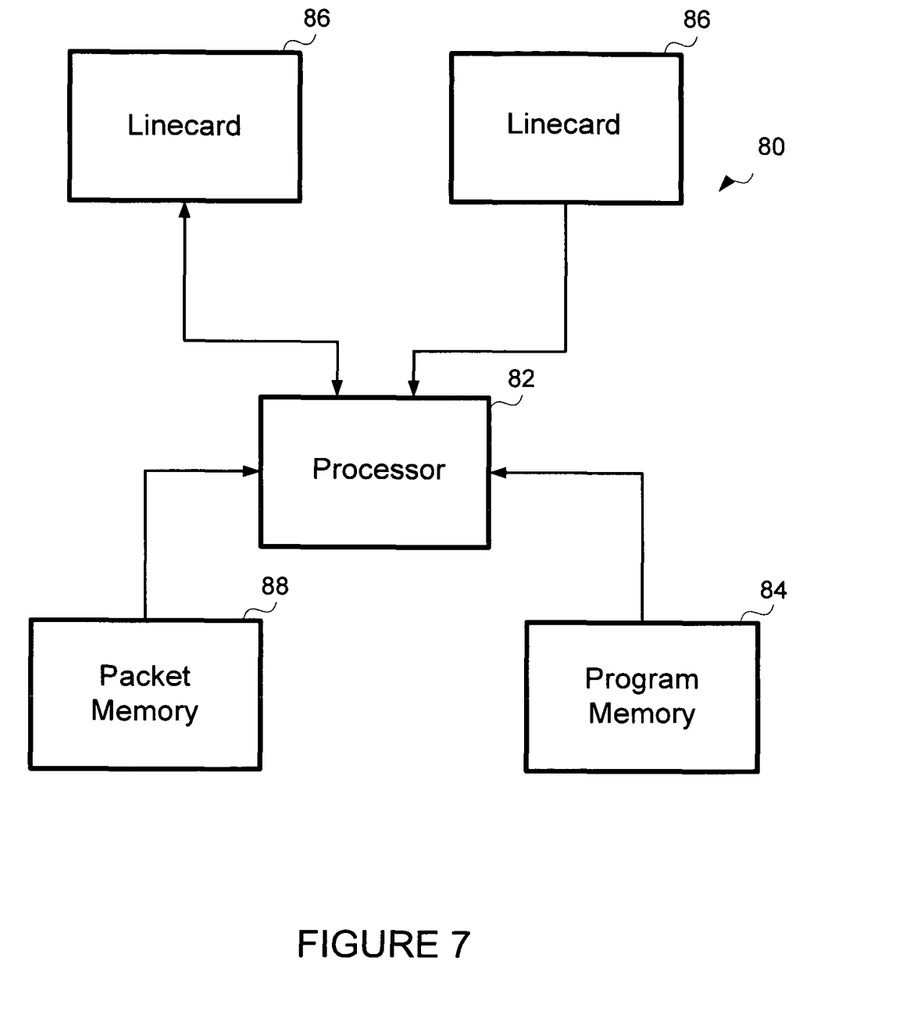
FIG. 7 depicts an example of a network device useful in implementing embodiments described herein.

FIG. 7 depicts a network device 80 that may be used to implement embodiments described herein. Network device 80 is configured to implement all of the network protocols and extensions thereof described above. In one embodiment, network device 80 is a programmable machine that may be implemented in hardware, software, or any combination thereof. A processor 82 executes codes stored in a program memory 84. Program memory 84 is one example of a computer-readable medium. Program memory 84 can be a volatile memory. Another form of computer-readable medium storing the same codes is a type of non-volatile storage such as floppy disks, CD-ROMs, DVD-ROMs, hard disks, flash memory, etc. Memory may be used, for example, to store link state information and port roles.

Network device 80 interfaces with physical media via a plurality of linecards 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole. It is to be understood that the network device 80 shown in FIG. 7 and described above is only one example and that different configurations of network devices may be used.

As can be observed from the foregoing, EGIP provides numerous advantages. For example, EGIP achieves rapid topology convergence across networks utilizing different protocols to prevent loops. In one embodiment, the system interacts with IS-IS to prevent loops caused by changes in DCE fabric due to a network merge or split. The system also interoperates with STP to preserve RSTP's rapid convergence behavior. Furthermore, the system only needs to be implemented on boundary devices, and thus requires no changes to core devices.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:
1. A method comprising:
at a first network device located in a first network comprising network devices operating a link state routing protocol to prevent loops in said first network, communicating with a second network comprising network devices operating a spanning tree protocol to prevent loops in said second network:
receiving from one of the network devices operating said link state protocol, a link state routing synchronization packet at said first network device in communication with one of the network devices operating said spanning tree protocol;

blocking at said first network device, boundary ports in communication with the network devices operating said spanning tree protocol;

transmitting a link state routing synchronization acknowledgement packet at said first network device after the boundary ports are blocked; and performing a loop-free topology convergence process at said first network device to prevent loops.

2. The method of claim 1 wherein the link state routing protocol is Intermediate System-to-Intermediate System (IS-IS).

3. The method of claim 1 further comprising receiving a synchronization message from said link state routing protocol at the first network device before blocking the boundary ports.

4. The method of claim 3 further comprising sending a synchronization acknowledgement message to said link state routing protocol at the first network device before transmitting the synchronization acknowledgement packet.

5. The method of claim 1 wherein performing said convergence process comprises transmitting a proposal from a tunnel port at said first network device and receiving an agreement at the tunnel port.

6. The method of claim 1 wherein performing said convergence process comprises recomputing port roles at said first network device based on port roles of at least one of the network devices operating said spanning tree protocol.

7. An apparatus comprising:
an interface at a first at a first network device configured for operating in a first network comprising network devices operating a link state routing protocol to prevent loops in said first network, and for communication with a second network comprising network devices operating a spanning tree protocol to prevent loops in said second network;

a processor operable to process a link state routing synchronization packet received at said first network device operating said link state routing protocol and in communication with one of the network devices operating said spanning tree protocol, block boundary ports in communication with the network devices operating said spanning tree protocol in response to processing of the link state routing synchronization packet, generate a synchronization acknowledgement packet after said boundary ports are blocked, and perform a loop-free topology convergence process with the other network devices operating said link state routing protocol and in communication with the network devices operating said spanning tree protocol to prevent loops; and memory for storing link state information and port roles for the boundary ports.

8. The apparatus of claim 7 wherein the processor is configured to generate an internal synchronization message and process an internal synchronization acknowledgement message before blocking the boundary ports.

9. The apparatus of claim 8 wherein the processor is configured to send a synchronization acknowledgement message to said link state routing protocol at the first network device before transmitting the synchronization acknowledgement packet.

10. The apparatus of claim 7 wherein performing said loop-free topology convergence process comprises generating a proposal and processing an agreement.

11. The apparatus of claim 7 wherein the processor is configured to recompute port roles.

12. The apparatus of claim 7 wherein the link state routing protocol is Intermediate System-to-Intermediate System (IS-IS).

13. The apparatus of claim 7 wherein performing said convergence process comprises transmitting a proposal from a tunnel port at the apparatus and receiving an agreement at the tunnel port.

14. The apparatus of claim 7 wherein performing said convergence process comprises recomputing port roles at the apparatus based on port roles of at least one of the network devices operating said spanning tree protocol.

15. An apparatus comprising:
an interface at a first network device configured for operating in a first network comprising network devices operating a link state routing protocol to prevent loops in said first network, and for communication with a second network comprising network devices operating a spanning tree protocol to prevent loops in said second network;

means for receiving from one of the network devices operating said link state protocol, a link state routing synchronization packet at said first network device in communication with one of the network devices operating said spanning tree protocol;

means for blocking at said first network device, boundary ports in communication with the network devices operating said spanning tree protocol;

means for transmitting a link state routing synchronization acknowledgement packet at said first network device after the boundary ports are blocked; and means for performing a loop-free topology convergence process at said first network device to prevent loops.

16. The apparatus of claim 15 wherein the link state routing protocol is Intermediate System-to-Intermediate System (IS-IS).

17. The apparatus of claim 15 further comprising means for receiving a synchronization message from said link state routing protocol at the first network device before blocking the boundary ports.

18. The apparatus of claim 17 further comprising means for sending a synchronization acknowledgement message to said link state routing protocol at the first network device before transmitting the synchronization acknowledgement packet.

19. The apparatus of claim 15 wherein means for performing said convergence process comprises means for transmitting a proposal from a tunnel port at said first network device and receiving an agreement at the tunnel port.

20. The apparatus of claim 15 wherein means for performing said convergence process comprises means for recomputing port roles at said first network device based on port roles of at least one of the network devices operating said spanning tree protocol.

* * * * *